Sept. 20, 1932.     A. LADE     1,878,453
RUBBER CUTTING MACHINE
Filed Sept. 18, 1930     2 Sheets-Sheet 1
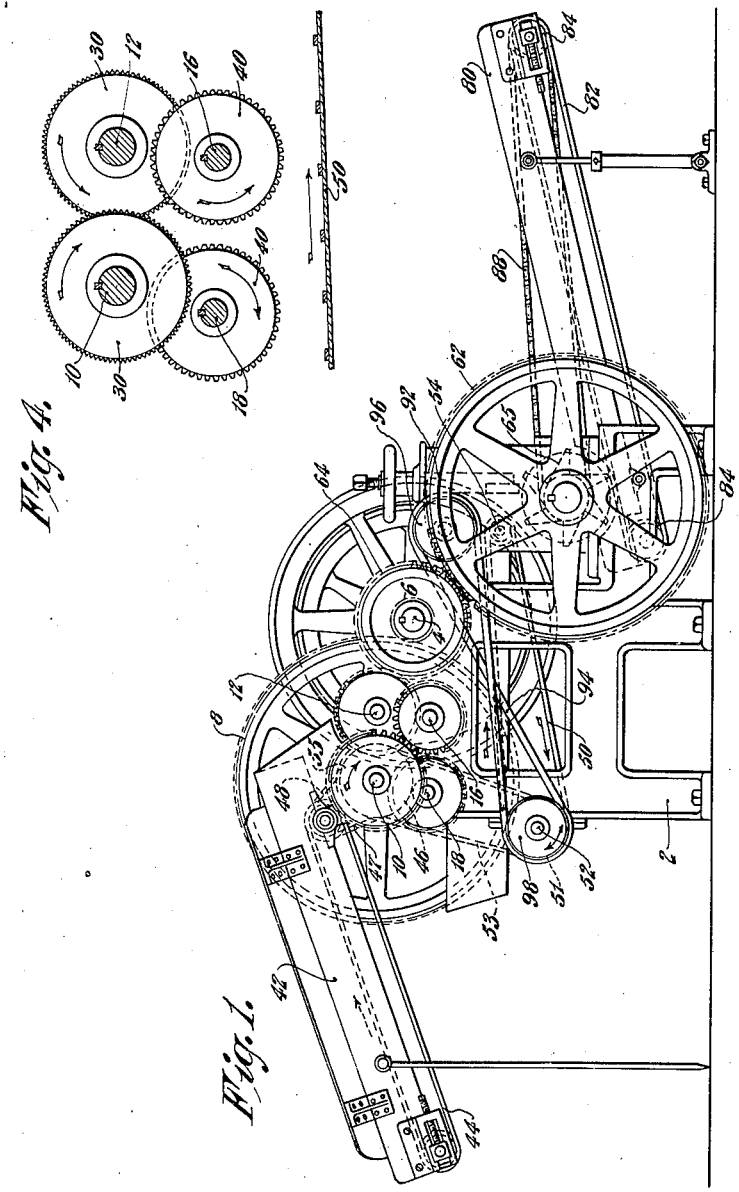
INVENTOR,
Archibald Lade,
BY
his ATTORNEY.

Sept. 20, 1932.  A. LADE  1,878,453
RUBBER CUTTING MACHINE
Filed Sept. 18, 1930    2 Sheets-Sheet 2

INVENTOR,
Archibald Lade,
BY
his ATTORNEY.

Patented Sept. 20, 1932

1,878,453

UNITED STATES PATENT OFFICE

ARCHIBALD LADE, OF NORTHAMPTON, MASSACHUSETTS, ASSIGNOR TO B. F. PERKINS & SON, INC., OF HOLYOKE, MASSACHUSETTS, A CORPORATION OF MASSACHUSETTS

RUBBER CUTTING MACHINE

Application filed September 18, 1930. Serial No. 482,741.

This invention relates to improvements in cutting machines and the like and is directed more particularly to machines for cutting sheets of rubber into relatively small pieces.

The principal objects of the invention are the provision of a machine which is not only simple in construction, so as to be economical to manufacture, but which by reason of its simplicity and novel form is efficient in operation whereby the utmost production can be obtained at a comparatively low cost.

The machine of the invention is adapted to operate on or comminute rubber and the like. For instance, rubber in sheet form may be passed through the machine and cut into strips which are then severed into pieces of more or less uniform size. It is desirable to cut up rubber into pieces of substantially uniform size so that the material is in suitable form for subsequent operations such as refining or corresponding operations. Of course material other than sheets may be operated on by the machine. Where sheets are to be cut up they may be placed on the conveyor and where material is to be passed through the machine it is placed on the conveyor.

The novel objects of the invention are accomplished by a novel combination and arrangement of parts which are hereinafter more fully described in connection with the accompanying drawings wherein:

Fig. 1 is a side elevational view of a cutting machine embodying the novel features of the invention.

Fig. 4 is a sectional view taken on the line 4—4 of Fig. 3.

Figure 3:
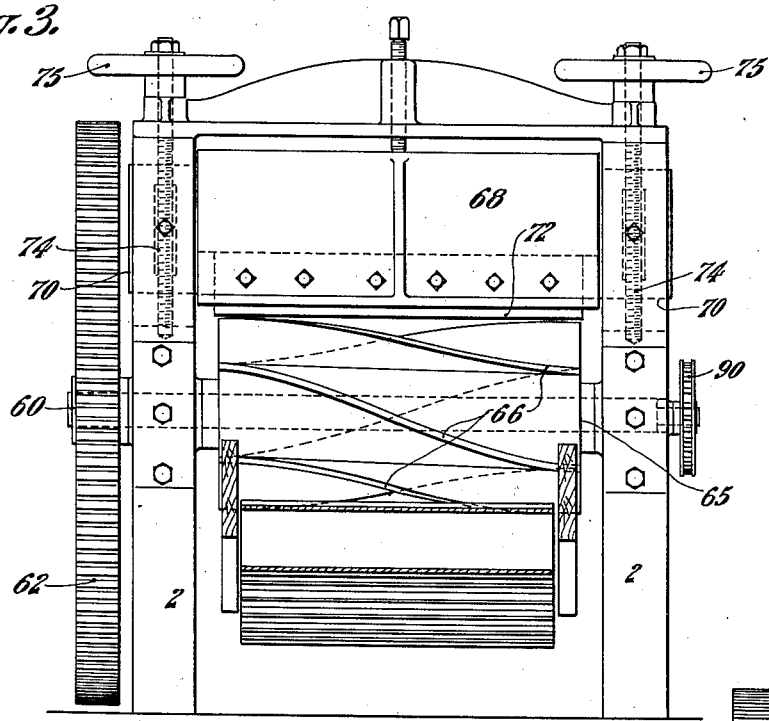
Fig. 3 is an end elevational view of the machine at a scale larger than that of Fig. 1.

Referring now to the drawings in detail, the invention will be more fully described. Side frames 2 are provided which are suitably held together in spaced relation. A main shaft 4 is suitably journalled in the side frames, and carries a pinion 6 which meshes with a gear 8 fixed to the end of a slitter shaft 10. The driving shaft 4 may of course be driven from any suitable source of power and at any desired speed.

Figure 2:
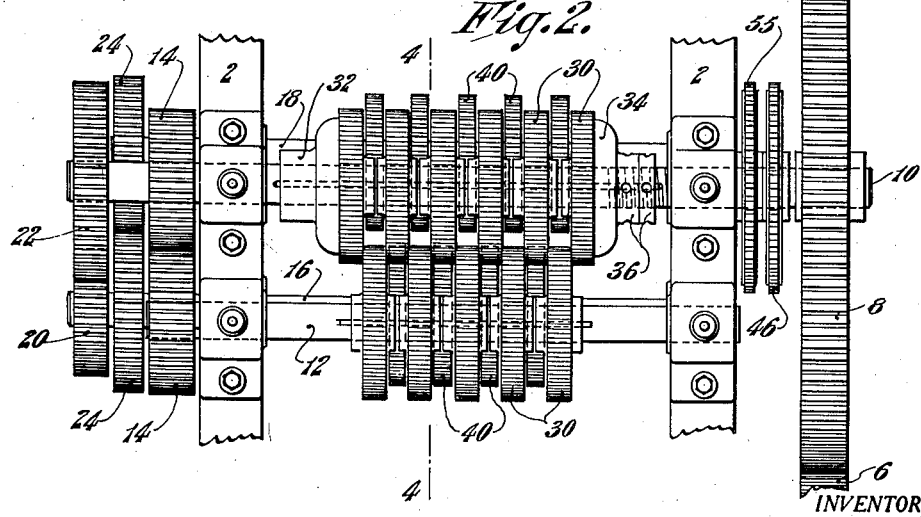
Fig. 2 is a fragmentary plan view of the machine showing the novel slitting elements thereof.

The slitter shaft 10 is operatively connected to another similar slitter shaft 12 forwardly thereof by means of gears 14 affixed thereto, see Fig. 2. There are two other shafts called clearer shafts 16 and 18 disposed for rotation below the slitter shafts 10 and 12. The clearer shaft 16 carries a gear 20 which meshes with the gear 22 on the slitter shaft 10 and other gears 24 are carried by the clearer shafts which are in meshing engagement. The upper slitter shafts are rotated towards one another in opposite directions while the cleaner shafts below are likewise rotated, see Fig. 4.

A plurality of slitter disks are carried by the shafts 10 and 12 which are indicated by the numeral 30. The slitter disks 30 on the shaft 10 are held against rotation thereon but may move towards and away from one another. A collar 32 affixed to the shaft 10 at the left-hand end and a collar 34 movable therealong by means of members 36 in threaded engagement with the shaft serve to move the disks towards one another. Slitter disks 30 on the shaft 12 are relatively non-rotatable thereon but may move along the shaft if necessary.

According to the preferred form of the invention, the disks 30 of shaft 12 interleave with or operate between the disks 30 of shaft 10. The collar 34 may be moved relative to the collar 32 so that the two sets of disks are operated close together so that their abutting coacting peripheral side edges as they rotate operate with a shearing action for slitting material such as sheet rubber or the like.

According to one novel feature of the invention the peripheral edges of the disks 30 are provided with transverse grooves and ridges so that there is provided a multiplicity of comparatively sharp and angularly disposed edges. Clearer disks 40 are carried by the lower shafts 16 and 18. These disks are relatively narrow and are arranged to rotate between the slitter disks. They function to feed material which has been slit downwardly and to free material from the edges of the slitter disk.

A feed chute 42 at the rear end of the machine has an endless feed belt 44, supported on suitable rolls so that the upper run of the belt serves as a bottom for the sheets. A sprocket 46 on shaft 10 is connected by a chain 47 to a smaller sprocket 50 of one of said rolls whereby the endless belt 44 is driven from this shaft 10.

Material such as rubber or the like and which may, if desired, be in sheet form, is placed in the chute so that it falls onto and between the slitter disks 30. As these rotate inwardly or towards one another as shown in Fig. 4, peripheral cutting edges slit or cut the material into strips. The width of the slitter disks and the spacing thereof determine the widths of the said strips, but these may of course be varied.

An intermediate endless belt 50 is disposed to underlie the slitter and clearer disks and has its rearward end supported on a roller of a shaft 52. Its forward end is similarly supported on a suitable roll of a shaft 54. The shaft 52 is driven from the slitter shaft 10 by sprocket and chain mechanism indicated by 51, 53 and 55. The belt 50 travels in the direction of the arrow and its upper run receives the material which has been slit by the slitters above. By means of the belt 50 the strips of material are carried forwardly of the machine.

A rotary cutter shaft 60 is rotatable in the side frames and is rotated from shaft 4 by means of gears 62 and 64 fixed to said shafts 4 and 60. Between the side frames there is fixed to the shaft 60 a rotary cutting member indicated generally by 65, see Fig. 3. This cutting element 65 is preferably provided with radial cutting fins 66, the cutting edges of which are disposed spirally of the axis of the shaft. A slide member 68 having lugs 70 slidable in the side frames carries on its lower side a cutter bar 72. This cutter bar co-operates with the cutting edges of the cutting element 65 for cutting the strips which are fed forwardly by the belt 50 into relatively short lengths. Screws 74 rotatable by hand wheels 75 are in threaded engagement with the lugs 70 and are provided for raising and lowering the member 68 and with it the cutter bar 72. A discharge chute 80 has an endless belt 82 in the lower side thereof the upper end of which functions as the bottom of the chute. This belt 82 is supported on rollers 84 rotatable in opposite ends of the chute and the forward roller is driven by means of a chain 88 in engagement with a sprocket 90 on the end of shaft 60.

In operation material which may be rubber in sheet form and which may be of considerable thickness is placed in the feed chute 42 so that it is fed forwardly and upwardly by the belt and delivered to the upper sides of the slitter rolls. These rolls coact to slit the material into strips which will about equal the width of the slitter disks or the distance therebetween. The strips pass downwardly onto the belt 50 which conveys the strips forwardly so that they are delivered between the rotatable element 65 and the cutter bar 72 thereabove. The shaft 60 may be arranged to rotate at such a speed and the cutting elements of the member 65 may be inclined at such an angle that the strips may be cut into any desired lengths. It has been found to be desirable in the case of rubber to slit the material so that the strips are from one to two inches wide, while the cutting elements 65 and 72 are so arranged as to cut these strips into lengths from three to eight or nine inches.

By thus slitting the rubber into strips and subsequently severing the strips into relatively short pieces, the material is reduced to a convenient size for subsequent operation. Not only does the machine cut the material to the proper size, but the size of the material is desirably uniform. This is accomplished by first slitting the material into strips of predetermined width and then in cutting the strips into lengths of some predetermined dimension.

A shaft 92 rotatable in the side frames above belt 50 may have disks thereon for assisting in the forward feeding of strips of material. The said shaft 92 is operated by means of the belt 94 and pulleys 96 and 98.

Having described the invention in the form at present preferred, what I desire to claim and secure by Letters Patent of the United States is:

1. A cutting machine of the class described comprising in combination, slitter shafts carrying interleaving slitter disks, the said disks having transverse grooves and ridges on the peripheries thereof, a clearer shaft having clearing disks operating between said slitter disks, a feed conveyor for delivering material to said slitter disks, a rotatable cutting member having spiral cutting elements, a cutter bar located forward of said slitter for coacting with said cutting elements and clearer disks and an intermediate conveyor below said slitter disks for delivering material to said cutting member.

2. A cutting machine of the class described comprising in combination, slitter shafts carrying interleaving slitter disks, the said disks having transverse grooves and ridges on the peripheries thereof, a clearer shaft having clearing disks operating between said slitter disks, a feed conveyor for delivering material to said slitter disks, a rotatable cutting member having spiral cutting elements, a cutter bar located forward of said slitter for coacting with said cutting elements and clearer disks, an intermediate conveyor below said slitter disks for delivering material to said cutting member and a discharge conveyor for receiving material cut by the said cutting member and bar.

3. A cutting machine of the class described comprising in combination, slitter shafts carrying interleaved slitter disks, clearer shafts having clearing disks operating between said slitter disks, a feed conveyor for delivering material to said slitter disks, a rotatable cutting member having spiral cutting elements thereon, a cutter bar for coacting with said elements adapted for movements relative to said cutting member, an intermediate conveyor underlying said slitter and clearer disks for receiving the material which has been slit and delivering it to the cutting members, and a discharge conveyor for receiving the material cut by said cutting member and cutter bar.

4. A cutting machine of the class described comprising in combination, slitter shafts carrying interleaved slitter disks, clearer shafts disposed for rotation below said slitter shafts and having clearing disks operating between said slitter disks, a feed conveyor for delivering material to said slitter disks, an intermediate conveyor below said slitter for forwardly feeding the material slit by said slitter disks, a rotatable cutting member, a movable cutter bar for coacting with said cutting member, located forwardly of said slitter and clearer disks for cutting strips fed from said intermediate conveyor and a discharge conveyor for receiving material cut by said cutting elements.

5. A cutting machine of the class described comprising in combination, slitter shafts carrying interleaved slitter disks, means on said shafts for moving the sets of disks along their separate shafts towards or away from one another so that their peripheral side edges abut and coact for a shearing action, clearer shafts disposed for rotation below said slitter shafts and having clearing disks operating between said slitter disks for feeding the material through the slitting operation, a feed conveyor for delivering material to said slitter disks, an intermediate conveyor below said slitter disks for forwardly feeding the material slit by said slitter disks, a rotatable cutting member, a movable cutter bar for coacting with said cutting member, located forwardly of said slitter and clearer disks for cutting strips fed from said intermediate conveyor and a discharge conveyor for receiving material cut by said cutting elements.

6. A cutting machine of the class described comprising in combination, slitter shafts carrying interleaved slitter disks, means on said shafts for moving the sets of disks along their separate shafts towards or away from one another so that their peripheral side edges abut and coact for a shearing action, clearer shafts disposed for rotation below said slitter shafts and having clearing disks operating between said slitter disks for feeding the material through the slitting operation, a feed conveyor for delivering material to said slitter disks, and driven by one of said slitter disks, an intermediate conveyor below said slitter disks for feeding the material slit by said slitter disks and driven by one of said slitter shafts, a rotatable cutting member, a movable cutter bar for coacting with said cutting member, located forwardly of said slitter and clearer disks for cutting strips fed from said intermediate conveyor and a discharge conveyor for receiving material cut by said cutting elements.

In testimony whereof I affix my signature.
ARCHIBALD LADE.